March 13, 1934.   I. J. BABCOCK   1,951,121
ROTARY DISK VALVE

Filed Jan. 11, 1932

Inventor:
Ira J. Babcock,
By: Fisher, Clapp, Soans & Pond,
attys

Patented Mar. 13, 1934

1,951,121

UNITED STATES PATENT OFFICE 1,951,121

ROTARY DISK VALVE

Ira J. Babcock, Chicago, Ill.

Application January 11, 1932, Serial No. 585,849

1 Claim. (Cl. 251—84)

This invention relates to disk valves of the type commonly inserted in a line of pipe to open and shut off the flow of a fluid therethrough. One object of the present invention is to provide a very simple, inexpensive, compact and efficient valve of this character. Another object is to provide a valve of this type which, by reason of its construction, shall be well adapted and designed to prevent the lodgment therein of fine particles of grit and the like between relatively movable parts, and thus be leak-proof. This last-named characteristic is especially desirable in such valves as blowoff valves for steam boilers, wherein the steam frequently carries fine particles of scale which lodge in the valve parts, causing wear and leakage. A still further object of the invention is to provide a valve of this type wherein wear caused by uneven stresses on different portions of relatively sliding surfaces, with consequent uneven wear, are avoided, and wherein the use of packing rings, gaskets, and the like may be dispensed with.

Still other objects and attendant advantages of the invention will be apparent to persons familiar with this class of devices from the following detailed description, taken in connection with the accompanying drawing wherein I have illustrated one simple and practical physical embodiment of the principle of the invention, and in which—

Figure 1:
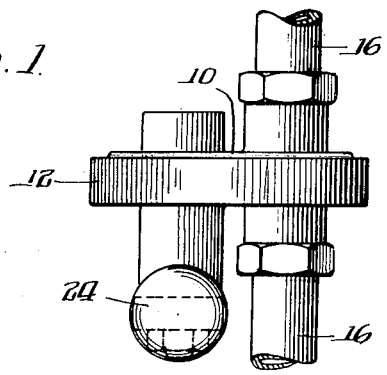
Fig. 1 is a top plan view of my improved rotary disk valve shown as inserted in a horizontal pipe line.
Figure 2:
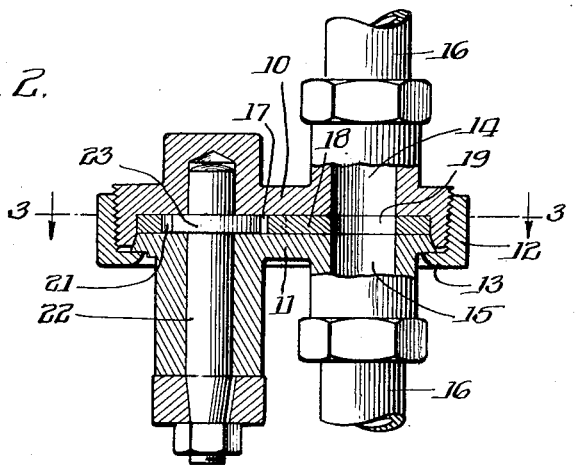
Fig. 2 is a horizontal axial section, showing the valve in open position.

Referring to the drawing, the valve casing is preferably formed by a shallow cup-shaped round body member 10, a closure member 11, and a clamping ring 12. As best shown in Fig. 2, the internal periphery of the open end of the body member 10 and the periphery of the closure member 11 are preferably formed on a slight taper, so as to insure a tight fit of the closure member in the body member of the casing. The ring 12 which screws onto the body member 10 is formed with an internal annular lip or flange 13 that overlaps the outer peripheral portion of the closure member 11. The opposite side walls of the casing thus formed are provided with opposed openings 14 and 15 that are designed and adapted to be connected into a pipe line 16 in the installation of the device. This construction provides within the casing a narrow circular chamber 17, which is occupied by a rotatable disk valve 18 that has a sliding fit with the side and peripheral walls of the chamber 17. This disk valve 18 is formed with an eccentric opening 19 that, by rotating the disk 18, is movable into and out of register with the pipe line openings 14 and 15 of the casing. The disk 18 is further formed with a sector-shaped opening 20, clearly shown in Figs. 3 and 4, the outer edge of which is formed as an arcuate gear rack 21 struck from the axis of the disk valve as a center. Journaled in the casing and extending through the opening 20 is a shaft 22, fast on which is a segment pinion 23 that meshes with the gear rack 21, this segment pinion 23 occupying the opening 20. Fast on the outer end of shaft 22 is an operating handle 24.

Figure 3:
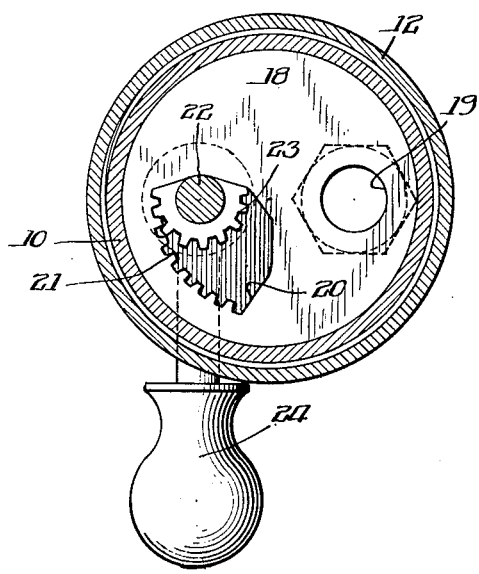
Fig. 3 is a transverse section taken on the line 3—3 of Fig. 2, viewed in the direction indicated by the arrows.
Figure 4:
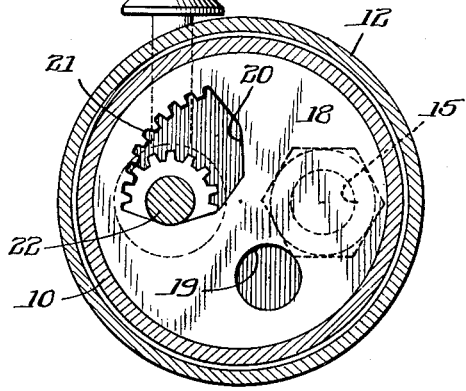
Fig. 4 is a view similar to Fig. 3, but showing the relative positions of the parts when the valve is closed.

Fig. 4 illustrates the positions of the parts when the valve is closed. To open the valve, the handle 24 is swung downwardly through substantially a half circle to the position indicated in Fig. 3. This carries the opening 19 into full register with the openings 14 and 15 and opens the pipe line. Preferably and as shown in Fig. 3, the opening 22 in which the segment pinion 23 lies is made of such a width that the flat side of the segment pinion 23 will contact with a side wall of the opening when the flow opening 19 has been brought into full register with the pipe line. The opposite edge of the opening also forms a stop to limit the upward swing of the handle 24 when closing the valve, as shown in Fig. 4.

From the foregoing it will be readily perceived how the described construction effectuates the stated purposes and objects of the invention. Manifestly, the structure is exceedingly simple and compact, and the sliding fit of the rotary disk member 18 on the walls of its containing chamber may be made so perfect as to obviate the necessity of gaskets, packing rings, etc., and prevent fine particles of grit, scale and the like creeping between and injuring the contacting surfaces. Furthermore, the closeness of this fit may be varied as desired by more or less screwing down the clamping ring 12 on the body 10, and by reason of the tapered engaging portions of the body and closure member the adjustment secured is maintained against any bending stresses in the pipe line or other like stresses. This construction also avoids the necessity of packing the joint between the body and closure member, permits automatic adjustment of the relatively sliding parts, and overcomes any slight inequalities of manufacture. By locating the actuating pinion 23 in an opening in the disk valve itself, which is the preferred construction, considerable space is saved; and furthermore, the parts are easily separable for cleaning, when required, by merely unscrewing the clamping ring 12.

I have herein shown and described what I believe to be the best and most practical embodiment of the invention which I have thus far designed, but manifestly the described structure may be considerably varied in detail without departing from the principle of the invention or sacrificing any of the advantages thereof, and hence I do not limit the invention to the particular construction herein presented for purposes of illustration, except to the extent clearly indicated in a specific claim.

I claim:

A rotary disk valve, comprising a casing formed of a cup-shaped body member having a circular chamber and a tapered open side, a closure member having a tapered periphery fitting said open side of the body member, said body and closure members having opposed openings adapted to be connected into a pipe line in the installation of the device, a rotary disk in said casing in sliding contact with the bottom and peripheral walls of said chamber and the inner face of said closure member and formed with an opening movable into and out of register with said first-named openings, a clamping ring screwing onto said body member and overlapping the marginal portion of said closure member, whereby to adjust the space between said body and closure members and retain said adjustment by means of the engaging tapered surfaces and the clamping ring, and means for rotating said disk.

IRA J. BABCOCK.